(12) United States Patent
Thangaraj et al.

(10) Patent No.: US 8,313,848 B2
(45) Date of Patent: *Nov. 20, 2012

(54) PERPENDICULAR MEDIA WITH CR-DOPED FE-ALLOY CONTAINING SOFT UNDERLAYER (SUL)

(75) Inventors: Raj Nagappan Thangaraj, Fremont, CA (US); Mariana Rodica Munteanu, Santa Clara, CA (US); Erol Girt, Fremont, CA (US); Michael J. Stirniman, Fremont, CA (US); Thomas Patrick Nolan, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,967

(22) Filed: Aug. 15, 2011

(65) Prior Publication Data

US 2012/0070694 A1 Mar. 22, 2012

Related U.S. Application Data

(63) Continuation of application No. 12/510,114, filed on Jul. 27, 2009, now Pat. No. 7,998,606, which is a continuation of application No. 11/068,898, filed on Mar. 2, 2005, now Pat. No. 7,566,508.

(51) Int. Cl.
*G11B 5/66* (2006.01)

(52) U.S. Cl. .................. 428/832; 427/131; 428/829

(58) Field of Classification Search .................. None
See application file for complete search history.

(56) References Cited

U.S. PATENT DOCUMENTS

| | | | |
|---|---|---|---|
| 6,172,859 B1 | 1/2001 | Watanabe et al. | |
| 6,599,376 B2 | 7/2003 | Morikawa et al. | |
| 6,703,773 B2 | 3/2004 | Ha et al. | |
| 7,083,870 B2 | 8/2006 | Shimizu et al. | |
| 7,361,419 B2 | 4/2008 | Uwazumi et al. | |
| 7,566,508 B2 * | 7/2009 | Thangaraj et al. | 428/832 |
| 7,998,606 B2 * | 8/2011 | Thangaraj et al. | 428/832 |
| 2004/0191570 A1 | 9/2004 | Edwards et al. | |
| 2004/0247941 A1 | 12/2004 | Chen et al. | |
| 2005/0129985 A1 | 6/2005 | Oh et al. | |
| 2008/0213628 A1 | 9/2008 | Hailu et al. | |
| 2009/0011283 A1 | 1/2009 | Girt et al. | |

FOREIGN PATENT DOCUMENTS

| | | |
|---|---|---|
| JP | 57192246 | 11/1982 |
| JP | 03268308 | 11/1991 |

OTHER PUBLICATIONS

File History for U.S. Appl. No. 12/510,114.
File History for U.S. Appl. No. 11/068,898.
Shi et al., "CoCrPt-SiO₂ Perpendicular Recording Media with a Crystalline Soft Underlayer", IEEE Transactions on Magnetics, vol. 42, No. 10, Oct. 2006, 3 pages.

* cited by examiner

*Primary Examiner* — Holly Rickman
(74) *Attorney, Agent, or Firm* — Hollingsworth Davis, LLC

(57) ABSTRACT

A perpendicular magnetic recording medium having a substrate, a Cr-doped Fe-alloy-containing underlayer containing about 8 to 18 at % Cr and a perpendicular recording magnetic layer, and a process for improving corrosion resistance of the recording medium and for manufacturing the recording medium are disclosed.

20 Claims, 7 Drawing Sheets

Protective Layer 16

Magnetic recording layer 15

2ⁿᵈ Non-magnetic intermediate layer 14 (optional)

1ˢᵗ Non-magnetic intermediate layer 13 (optional)

Soft magnetic underlayer 12

Seedlayer 11 (optional)

Substrate 10

PERPENDICULAR MEDIA WITH CR-DOPED FE-ALLOY CONTAINING SOFT UNDERLAYER (SUL)

RELATED APPLICATIONS

This application is a continuation of U.S. Ser. No. 12/510,114, filed Jul. 27, 2009, to issue as U.S. Pat. No. 7,998,606 on Aug. 16, 2011, which is a continuation of U.S. Ser. No. 11/068,898, filed Mar. 2, 2005, now U.S. Pat. No. 7,566,508, which are incorporated herein by reference in their entireties.

FIELD OF INVENTION

This invention relates to perpendicular recording media, such as thin film magnetic recording disks having perpendicular recording, and to a method of manufacturing the media. The invention has particular applicability to perpendicular media having Cr-doped FeCoB soft underlayer (SUL) for improved corrosion resistance, high areal density magnetic recording media exhibiting low noise.

BACKGROUND

A magnetic material is composed of a number of domains. Each domain contains parallel atomic moments and is magnetized to saturation, but the directions of magnetization of different domains are not necessarily parallel. Local preferred directions of magnetization depend upon the underlying microscopic structure of the material. Magnetic recording media microstructure generally includes grains or particles comprising regions of constant crystal structure or geometry. The local directions of easiest magnetization depend upon the geometry of the crystals. In the absence of an applied magnetic field, adjacent domains may be oriented in different directions, controlled by the underlying grain structure. The resultant effect of all these various directions of magnetization may be zero, as is the case with an unmagnetized specimen. When a magnetic field is applied, domains nearly parallel to the direction of the applied field become more prevalent at the expense of the others. A further increase in magnetic field causes more domains to rotate and align parallel to the applied field. When the material reaches the point of saturation magnetization, all domains are parallel to the applied field and no further domain growth or rotation would take place on increasing the strength of the magnetic field.

The ease of magnetization or demagnetization of a magnetic material depends on material parameters including composition, crystal structure, grain orientation, and the state of strain. The magnetization is most easily obtained along the easy axis of magnetization but most difficult along the hard axis of magnetization. A magnetic material is said to possess a magnetic anisotropy when easy and hard axes exist. On the other hand, a magnetic material is said to be isotropic when there are no easy or hard axes.

In a perpendicular recording media, magnetization is formed easily in a direction perpendicular to the surface of a magnetic medium, typically a magnetic recording layer on a suitable substrate, resulting from perpendicular anisotropy in the magnetic recording layer. On the other hand, in a longitudinal recording media, magnetization is formed in a direction in a plane parallel to the surface of the magnetic recording layer, resulting from longitudinal anisotropy in the magnetic recording layer.

Thin-film magnetic recording media require small exchange decoupled magnetic particles. Decoupling is commonly achieved by having a non-ferromagnetic material between the ferromagnetic particles. This non magnetic region has been formed in the prior art by films having a higher percent composition of either chromium, boron, or an oxide material at the boundaries between magnetic particles than within the magnetic particles. Separation of magnetic particles is imperfect, and some separation mechanisms are difficult to apply in a manufacturing process. An improved magnetic grain isolation method is desired.

The current perpendicular recording media (so called granular media) is processed using 02 reactive sputtering technique, and oxide dispersants to achieve smaller and physically isolated grains, and also uses a thick amorphous soft magnetic under layer (SUL) such as Fe, Ni, or Co-based alloy films as a mirror pole for recording performance. The Fe-based SUL forms a part of the media design. Since the SUL is based on iron, these alloy films are prone to severe corrosion. Because these Fe-based SUL films and other media layers are hard to cover at disk edges (chamfer area) as well as at mechanical defects (voids, pits etc.) by the carbon overcoat material, harsh environmental conditions (HCl and water vapors at ambient and elevated temperatures) make the edges and other mechanical defects at the data zone area severely susceptible to corrosion. This produces edge corrosion at the edges and defect corrosion at voids and other mechanical defects. Hence, solution(s) that provide a corrosion-resistant SUL in the perpendicular media design and prevents the edge as well as the mechanical defect corrosion of the perpendicular media is desired.

SUMMARY OF THE INVENTION

The invention provides a perpendicular magnetic recording medium having high areal recording density exhibiting low noise and high corrosion resistance. One way of achieving this goal is to produce a soft magnetic film in the perpendicular magnetic recording medium having a Fe-based SUL, preferably an amorphous Fe-based SUL, having doped Cr to improve the corrosion performance of perpendicular media. The amorphous Fe-based SUL films more preferably are ternary Fe-alloys comprising Co and B doped with various levels of Cr.

One embodiment is a perpendicular magnetic recording medium comprising a substrate, a Cr-doped Fe-alloy-containing underlayer comprising about 8 to 18 at % Cr and a perpendicular recording magnetic layer. Preferably, the recording medium comprises a substantially radial or transverse anisotropy. Preferably, the underlayer provides a return path for a recording head. Preferably, the underlayer comprises a soft magnetic material. Preferably, the soft magnetic material is substantially amorphous. In one variation, the recording medium further comprises a seedlayer that changes a magnetostriction of the underlayer. Preferably, the Fe-alloy is selected from the group consisting of a FeCoB alloy, a CoFeZr alloy, a CoFeTa alloy, and a FeCoZrB alloy.

Another embodiment is a method of improving corrosion resistance of a magnetic recording medium comprising sputtering Cr-doped FeCoB directly from a candidate target material comprising Cr-doped FeCoB, forming a Cr-doped FeCoB containing underlayer on a substrate and depositing a magnetic perpendicular recording layer on the Cr-doped FeCoB containing underlayer, wherein the Cr-doped FeCoB containing underlayer has a polarization resistance of at least $1 \times 10^5$ ohm-cm$^2$. Preferably, the polarization resistance is at least $1 \times 10^6$ ohm-cm$^2$. Preferably, the material is a Fe-alloy. Preferably, the Fe-alloy is selected from the group consisting of a FeCoB alloy, a CoFeZr alloy, a CoFeTa alloy and a FeCoZrB alloy. Preferably, the underlayer comprises a soft magnetic material. Preferably, the soft magnetic material is substantially amorphous. Preferably, the Cr-doped underlayer comprises about 10-16 at % Cr.

Another embodiment is a method of manufacturing a magnetic recording medium, comprising co-depositing Cr with a Fe-containing material in a sputter chamber to form a Cr-doped Fe-containing underlayer on a substrate and depositing a magnetic perpendicular recording layer. Preferably, the Fe-containing material is a Fe-alloy. Preferably, the Fe-alloy is selected from the group consisting of a FeCoB alloy, a CoFeZr(or Ta) alloy, and a FeCoZrB alloy. Preferably, the underlayer comprises an amorphous soft magnetic material. Preferably, the Cr-doped Fe-containing underlayer comprises about 10-16 at % Cr.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Figure 1:
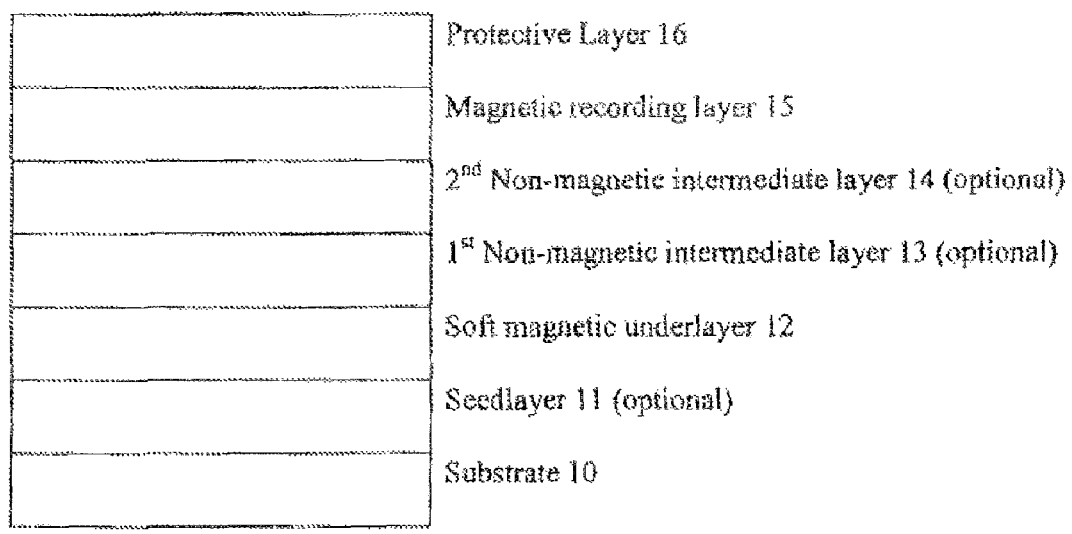
FIG. 1 is a schematic of an embodiment of a perpendicular recording medium of this invention.

A preferred embodiment of a perpendicular recording medium of this invention is shown in FIG. 1. The thickness of seedlayer 11 is about 1-10 nm, preferably, about 2-5 nm. The thickness of the amorphous soft magnetic underlayer 12 is preferably greater than 30 nm, more preferably, about 100-200 nm, and the thickness of magnetic recording layer 15 deposited on the underlayer is about 10-20 nm. In between the amorphous soft magnetic underlayer 12 and the magnetic recording layer 15 could be an intermediate layer 13 and 14 of thickness of about 5-30 nm. Protective layer 16 typically covers the magnetic recording layer 15.

Figure 2:
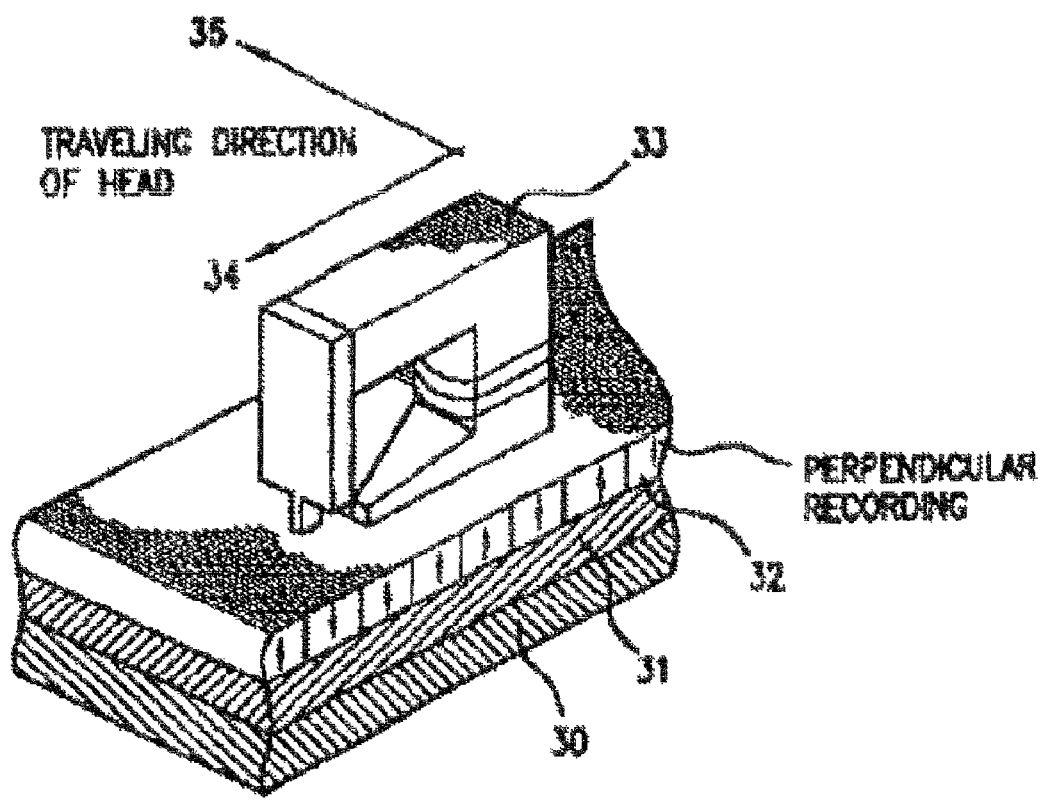
FIG. 2 is a schematic of a perpendicular recording disk medium as incorporated in a disk drive.

A perpendicular recording disk medium as incorporated in a disk drive is shown in FIG. 2. The perpendicular recording disk medium has soft magnetic underlayer 31. The magnetic layer 32 of the perpendicular recording disk medium comprises domains oriented in a direction perpendicular to the plane of the substrate 30. Also, FIG. 1 shows the following: (a) a read-write head 33 located on the recording medium, (b) traveling direction 34 of head 33 and (c) transverse direction 35 with respect to the traveling direction 34.

This invention provides magnetic recording media suitable for high areal recording density exhibiting high SMNR. This invention achieves such technological advantages by forming a soft underlayer. A "soft magnetic material" is a material that is easily magnetized and demagnetized. As compared to a soft magnetic material, a "hard magnetic" material is one that neither magnetizes nor demagnetizes easily.

The underlayer is "soft" because it is made up of a soft magnetic material, which is defined above, and it is called an "underlayer" because it resides under a recording layer. In a preferred embodiment, the soft layer is amorphous. The term "amorphous" means that the material of the underlayer exhibits no predominant sharp peak in an X-ray diffraction pattern as compared to background noise. The "amorphous soft underlayer" of this invention encompasses nanocrystallites in amorphous phase or any other form of a material so long the material exhibits no predominant sharp peak in an X-ray diffraction pattern as compared to background noise.

When soft underlayers are fabricated by magnetron sputtering on disk substrates, there are several components competing to determine the net anisotropy of the underlayers: effect of magnetron field, magnetostriction of film and stress originated from substrate shape, etc. Although the effect of magnetron field is not easy to be controlled without changing the design of equipment, the effect of magnetostriction and stress is very easy to be controlled by changing the sputtering conditions.

Also, the soft magnetic under layers can be fabricated as single layers or multilayers with Ru or suitable spacer materials in between the soft under layers to enhance the signal to noise ratio (SNR) by antiferromagnetic coupling.

The fabrication of the soft underlayer target could be important in getting the desired film structure and properties without any magnetic and structural defects. The soft magnetic layer targets are manufactured by procedures outlined below in order to facilitate sputtering of thin films with desired magnetic and structural properties. This process uses a mixture of elemental metals and boron powder as starting ingredients to make Cr-doped FeCoB targets instead of the expensive gas atomized alloyed powder(s) process (AP). The consolidated weight is melted in a vacuum induction melter (VIM), cast into a mold at a temperature between 1200 to 1550° C., and solidified into an ingot. The ingot is then pre-heated to a temperature between 850 and 1200° C. in an annealing furnace suitable for rolling to desired thickness for final machining to precise target size. The key difference between VIM process and AP route is that the atomized powders of the ingredients could contain high level of oxygen, and to go through oxygen reduction process could be expensive.

A seedlayer is a layer lying in between the substrate and the underlayer. Proper seedlayer can also control anisotropy of the soft underlayer by promoting microstructure that exhibit either short-range ordering under the influence of magnetron field or different magnetostriction. A seedlayer could also alter local stresses in the soft underlayer. Thus, one embodiment of this invention relates to a method of inducing radial anisotropy in soft underlayers by seedlayer.

In a preferred embodiment, a magnetron field produces the radial anisotropy in the soft underlayer. In a magnetron, electrons generated from a heated cathode move under the combined force of a radial electric field and an axial magnetic field. By its structure, a magnetron causes moving electrons to interact synchronously with traveling-wave components of a microwave standing-wave pattern in such a manner that electron potential energy is converted to microwave energy with high efficiency.

The magnetron is a device of essentially cylindrical symmetry. On the central axis is a hollow cylindrical cathode. The outer surface of the cathode carries electron-emitting materials, primarily barium and strontium oxides in a nickel matrix.

Such a matrix is capable of emitting electrons when current flows through the heater inside the cathode cylinder.

At a radius somewhat larger than the outer radius of the cathode is a concentric cylindrical anode. The anode serves two functions: (1) to collect electrons emitted by the cathode and (2) to store and guide microwave energy. The anode comprises a series of quarter-wavelength cavity resonators symmetrically arranged around the cathode.

A radial dc electric field (perpendicular to the cathode) is applied between cathode and anode. This electric field and the axial magnetic field (parallel and coaxial with the cathode) introduced by pole pieces at either end of the cathode, as described above, provide the required crossed-field configuration.

Preferably, in the underlayer of the perpendicular recording medium of this invention, an easy axis of magnetization is directed in a direction substantially transverse to a traveling direction of the magnetic head. This means that the easy axis of magnetization is directed more toward a direction transverse to the traveling direction of the read-write head than toward the traveling direction. Also, preferably, the underlayer of the perpendicular recording medium has a substantially radial or transverse anisotropy, which means that the domains of the soft magnetic material of the underlayer are directed more toward a direction transverse to the traveling direction of the read-write head than toward the traveling direction.

Typically, when a magnetic recording medium is a tape, the tape travels and the head is stationary. Therefore, a traveling direction of the magnetic head of a stationary head of a recording device in which the magnetic recording tape moves is the direction in which the head "travels" spatially with respect to the magnetic recording tape.

In accordance with embodiments of this invention, the substrates that may be used in the invention include glass, glass-ceramic, NiP/aluminum, metal alloys, plastic/polymer material, ceramic, glass-polymer, composite materials or other nonmagnetic materials. Glass-ceramic materials do not normally exhibit a crystalline surface. Glasses and glass-ceramics generally exhibit high resistance to shocks.

A preferred embodiment of this invention is a perpendicular recording medium comprising an amorphous soft underlayer and a recording layer. The amorphous soft underlayer should preferably be made of soft magnetic materials and the recording layer should preferably be made of hard magnetic materials. The amorphous soft underlayer is relatively thick compared to other layers. Any layer between the amorphous soft underlayer and the recording layer is called an interlayer or an intermediate layer. An interlayer can be made of more than one layer of non-magnetic materials. The purpose of the interlayer is to prevent an interaction between the amorphous soft magnetic underlayer and recording layer. An interlayer could also promote the desired properties of the recording layer. Longitudinal recording media do not have an amorphous soft magnetic underlayer. Therefore, the layers named as "underlayer," "seed layer," "sub-seed layer," or "buffer layer" of longitudinal media are somewhat equivalent to the intermediate layer(s) of perpendicular media.

The underlayer and magnetic recording layer could be sequentially sputter deposited on the substrate, typically by magnetron sputtering, in an inert gas atmosphere. A carbon overcoat could be typically deposited in argon with nitrogen, hydrogen or ethylene. Conventional lubricant topcoats are typically less than about 20 Å thick.

When soft underlayers are fabricated by magnetron sputtering on disk substrates, there are several components competing to determine the net anisotropy of the underlayers: effect of magnetron field, magnetostriction of film and stress originated from substrate shape, etc. A seedlayer, which could be optionally added as a layer lying in between the substrate and the soft underlayer, can often control anisotropy of the soft underlayer by promoting microstructure that exhibit either short-range ordering under the influence of magnetron field or different magnetostriction. A seedlayer could also alter local stresses in the soft underlayer.

Amorphous soft underlayers produced smoother surfaces as compared to polycrystalline underlayers. Therefore, it was recognized by this invention that the use of amorphous soft underlayer is one way of reducing the roughness of the magnetic recording media for high-density perpendicular magnetic recording. The amorphous soft underlayers materials include a Cr-doped Fe-alloy-containing underlayer, wherein the Fe-alloy could be CoFeZr, CoFeTa, FeCoZrB and FeCoB.

Another advantage of amorphous materials as soft underlayer materials is the lack of long-range order in the amorphous material. Without a long-range order, amorphous alloys have substantially no magnetocrystalline anisotropy. According to this invention, the use of amorphous soft underlayer is one way of reducing noise caused by ripple domains and surface roughness. The surface roughness of the amorphous soft underlayer is preferably below 0.4 nm, more preferably below 0.3 nm, and most preferably below 0.2 or 0.1 nm.

In accordance with this invention, the average surface roughness (Ra) refers to the arithmetic average of the absolute values of the surface height deviations measured from a mean plane. The value of the mean plane is measured as the average of all the Z values within an enclosed area. The mean can have a negative value because the Z values are measured relative to the Z value when the microscope is engaged. This value is not corrected for tilt in the plane of the data; therefore, plane fitting or flattening the data will change this value.

$$R_a = [|z_1| + |z_2| + \ldots + |Z_n|]/N$$

The surface parameters of a layer such as that of the soft underlayer could be measured by atomic force microscope (AFM). The AFM used to characterize this invention has the trade name NanoScope.® The statistics used by the AFM are mostly derived from ASME B46.1 ("Surface Texture: Surface Roughness, Waviness and Law") available from the American Society of Mechanical Engineers, which is incorporated herein by reference.

Applicants recognized that the soft-underlayers manufactured according to the current methods have radial magnetic anisotropy induced by a field and altered magnetostriction by seedlayer by considering all possible origins of magnetic anisotropy:

(1) Magnetocrystalline anisotropy: Sputtered thin films listed as examples in this application form poly-crystalline microstructure. Crystallographic orientation of microcrystals in the films is random in the plane of disk. There is no reason why they form differently in radial and circumferential direction. Therefore, the disks of this invention do not have magneto crystalline anisotropy.

(2) Shape anisotropy: This also does not explain the anisotropy between radial and circumferential direction of the disks of this invention.

(3) Stress anisotropy: Magnetostriction can cause stress-induced anisotropy.

(4) External field induced anisotropy: When an external magnetic field is applied during film deposition, it can create short-range ordering that produces magnetic anisotropy in the direction of applied field. This method is used in manufacturing a read-write head of a recording medium. Similarly, this invention utilizes a magnetron field to apply a field in the radial direction of disks to produce radial anisotropy.

A perpendicular recording medium of this invention comprises a soft underlayer and a recording layer. A soft underlayer should preferably be made of soft magnetic materials and the recording layer should preferably be made of hard magnetic materials. A soft underlayer is relatively thick compared to other layers. Any layers between the soft underlayer and the recording layer is called interlayer or intermediate layer. An interlayer can be made of more than one layer of non-magnetic materials. The purpose of the interlayer is to prevent an interaction between the soft magnetic underlayer and recording layer. An interlayer could also promote the desired properties of the recording layer. Conventional (longitudinal) media do not have a soft magnetic underlayer. Therefore, the layers named as "underlayer," "seed layer," "sub-seed layer," or "buffer layer" of longitudinal media are somewhat equivalent to the intermediate layer(s) of perpendicular media.

In the preferred embodiment of the perpendicular media, it was easier to saturate the sample in radial direction than in circumferential direction. Thus, radial and circumferential directions are called the easy and hard axis, respectively. The underlayers of the disks could also have radial anisotropy. "Anisotropy" could be determined as described in U.S. Pat. No. 6,703,773, which is incorporated herein in entirety by reference.

The advantageous characteristics attainable by the present invention, particularly, as related to reduction or elimination of DC noise and improved corrosion resistance, are illustrated in the following examples.

EXAMPLES

All samples described in this disclosure were fabricated with DC magnetron sputtering except carbon films were made with AC magnetron sputtering.

Figure 3:
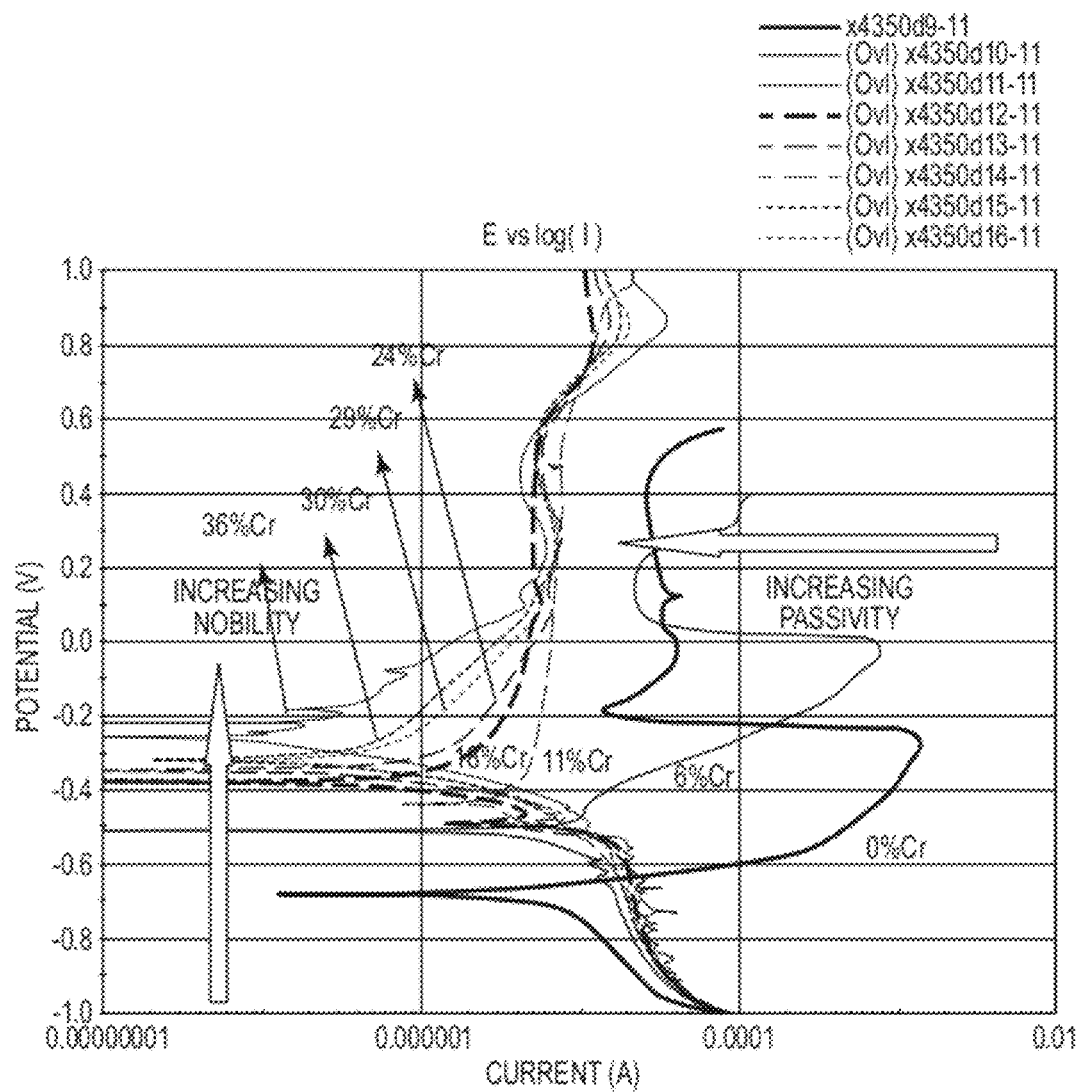
FIG. 3 shows potentiodynamic scans of Cr-doped FeCoB alloy films.

Cr enhances the passive state of iron even with low coverage possibly due to the formation of a Cr-enriched passive film. The Cr-doping was done by co-depositing Cr with a FeCoB alloy in a sputter chamber on to clean NiP/Al substrates. Alternatively, the Cr-doped FeCoB films could be directly sputtered onto the disk substrates that will eventually built into disk media from the Cr-doped FeCoB targets. A manufacturing process of such targets was briefly discussed above. The films were made to a thickness of 500-600 Å with and without a ~40 Å carbon overcoat. These films were tested for electrochemical corrosion performance (at ambient in O.IN NaCl) and compositional analysis by X-ray electron spectroscopy. The carbon-coated films were used for magnetic measurements as well as HCl vapor exposure experiment. FIG. 3 shows the potentiodynamic scans of Cr-doped FeCoB alloy films with varying Cr-content. The Cr at % was varied from 0 to 40% in the FeCoB alloy. As can be seen from the chart, as the Cr % increases, the passivity (decreasing corrosion current) as well as the nobility of the film increases (increasing open circuit potential). The chart is an example of how Cr addition helps improve the corrosion performance of Fe CoB alloy films. As can be seen from the graph, the "increasing passivity" arrow points towards increasing Cr content in the alloy, which clearly shows increasing Cr in the alloy decreases the corrosion (current). Also, increasing "nobility" as shown by an arrow indicates that by adding Cr in the FeCoB alloy, the corrosion potential increases. The corrosion potential is a potential above which the anodic corrosion starts to occur. The higher the corrosion potential, the lower is the inertia for corrosion to initiate.

Figure 4:
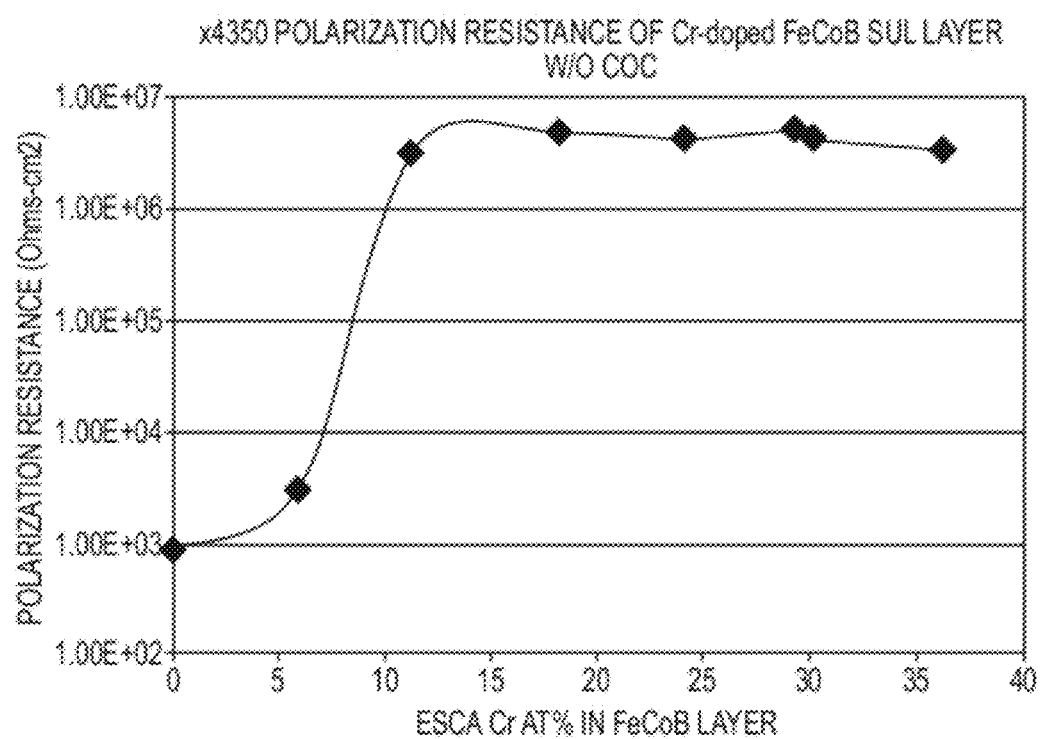
FIG. 4 shows polarization resistance of various Cr-doped FeCoB alloy films.

To further verify the observation of improved corrosion resistance with Cr at % increase in the underlayer shown in FIG. 3, electrochemical impedance spectroscopy (EIS) measurements were done for these samples in aerated O.IN NaCl electrolyte, and the polarization resistance was calculated from the spectra. As shown in FIG. 4, as the Cr-content increases, the polarization resistance increases and reaches a maximum at a Cr concentration of 11-15 at % (ESCA composition). From this data, it is clear that a preferred minimum amount of Cr in a Fe-alloy-containing underlayer would be about 8 at % Cr, preferably, about 9 or 10 at % Cr, and most preferably about 11 to 18 at % Cr to protect the FeCoB films from edge as well as general corrosion.

Figure 5:
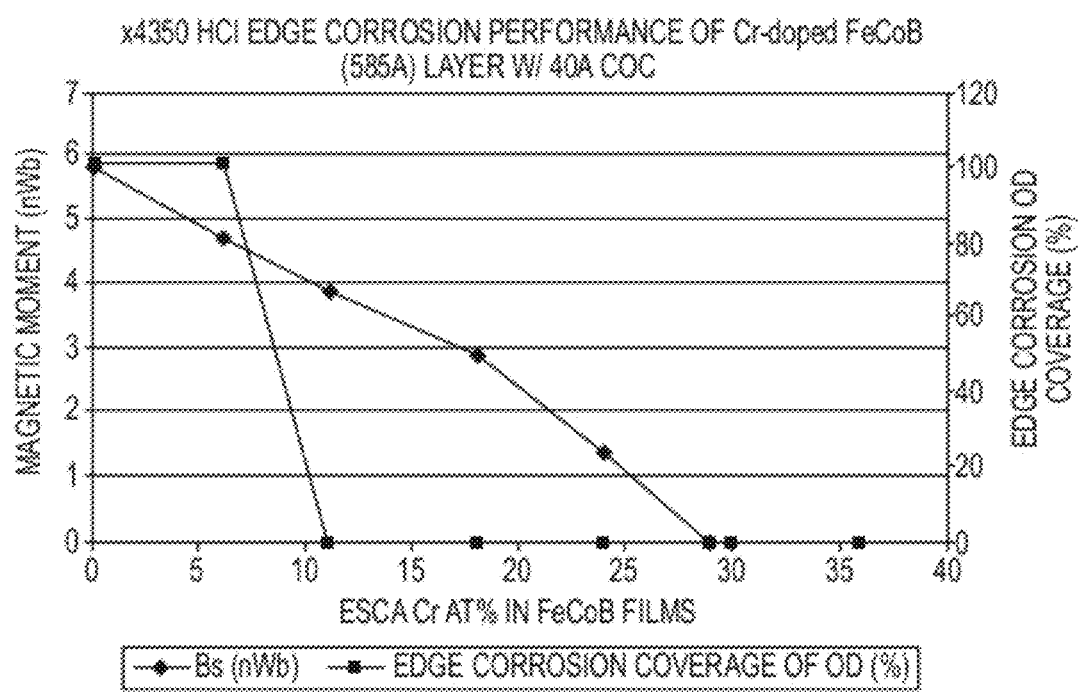
FIG. 5 shows edge corrosion coverage and magnetic moment for various Cr-doped FeCoB alloy films.

In order to see how these films perform in HCl vapor exposure, a 24-hr vapor exposure test above 0.5N HCl solution in an enclosed container was made, and the results are plotted in FIG. 5 along with the magnetic properties.

As shown in FIG. 5, as the Cr at % increases, the % of edge corrosion decreases from 100% coverage for the 0 at % Cr to almost 0% corrosion for 11 at % Cr doped FeCoB films. On the other hand, the magnetic moment (Bs) decreased by only about −30% for 11 at % Cr-containing films from a 0% Cr doped FeCoB alloy films.

Figure 6A:
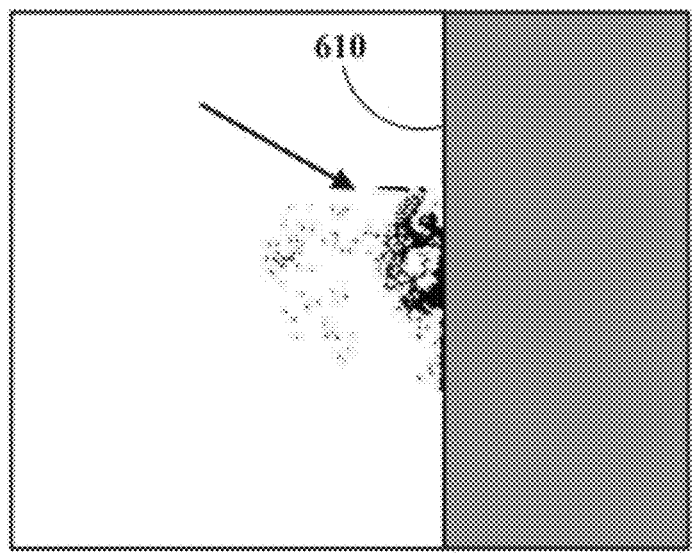
FIG. 6 shows the corrosion performance of the undoped and Cr-doped soft underlayer perpendicular media after 80°/80% T/RH exposure. a) Undoped soft underlayer media edge corrosion (arrow), b) Clean Cr-doped soft underlayer media edges free of edge corrosion, c) Undoped media data zone area showing void corrosion, and d) Cr-doped soft underlayer media data zone area free of void corrosion.
Figure 6B:
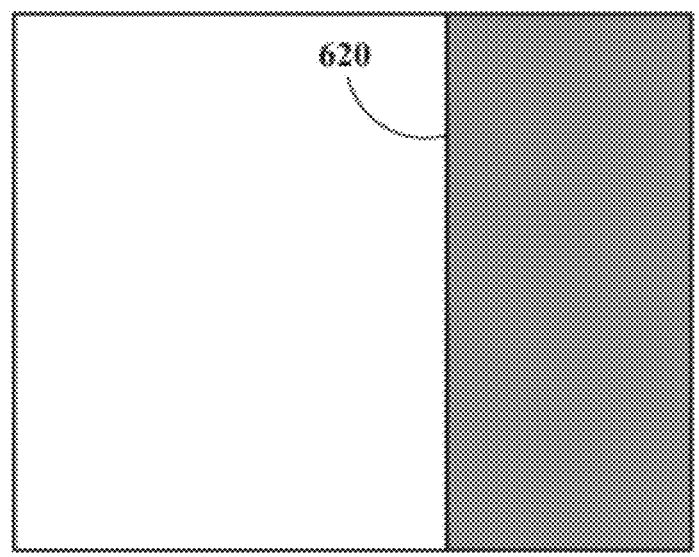
Figure 6C:
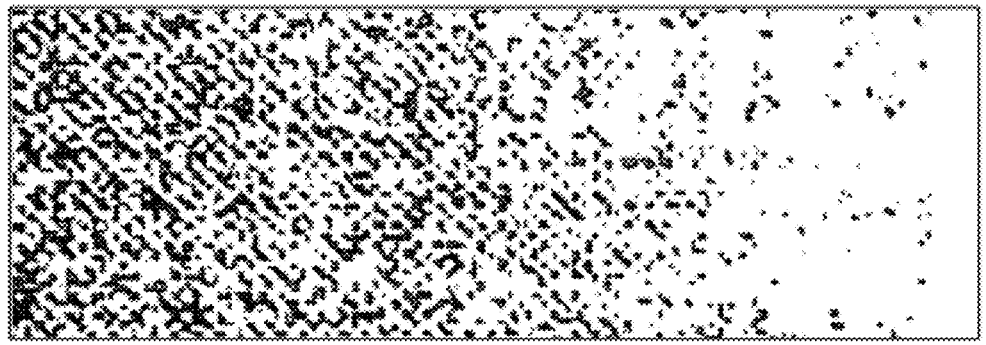
Figure 6D:
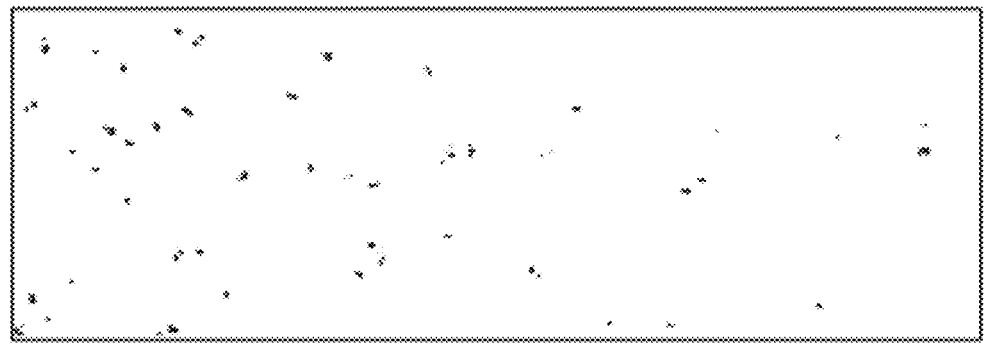

Also, additional experiments were carried out at different environmental conditions other than HCl exposure to see the corrosion performance of the new media having Cr-doped soft underlayer. Both the Cr-doped soft underlayer perpendicular media and the undoped soft underlayer perpendicular media were subjected to environmental exposure at 80° C. with a relative humidity of 80% for 4 days. After the exposure, the disks were examined using an optical microscope (for edge corrosion defects) as well as a surface reflectance analyzer tester (for void corrosion defects in the data zone area) to see whether there are any corrosion growths. As shown in FIG. 6a, the undoped soft underlayer perpendicular media shows a typical edge 610 with corrosion defects (arrow) whereas the Cr-doped FeCoB soft underlayer shows a clean edge 620 without any corrosion (FIG. 6b). On the other hand, the surface reflectance analyzer shows there are numerous void type corrosion in the data zone area (FIG. 6c), whereas the Cr-doped soft underlayer media shows almost a clean surface with few defects probably related to mechanical damage (FIG. 6d).

Based on the above unexpected experimental results, applicants recognized that preferably one should dope a minimum of about 8 at % Cr, preferably a minimum of about 10 at % Cr, more preferably of about 11 at % Cr, in a Fe-alloy-containing SUL such as FeCoB or other Fe and FeCo based SUL alloys to prevent the edge and general corrosion defects in perpendicular media. Also, keeping in mind the drop in the magnetic moment with increasing at % Cr in the underlayer film, the preferred range of doped Cr in a Fe-alloy-containing SUL should be 8-18 at % Cr, the more preferred range should be 10-16 at % Cr, and the most preferred range should be 11-15 at % Cr.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations that support any range within the disclosed numerical ranges even though a precise range limitation is not stated verbatim in the specification because this invention can be practiced throughout the disclosed numerical ranges. Finally, the entire disclosure of the patents and publications referred in this application are hereby incorporated herein in entirety by reference.

What is claimed is:

1. A perpendicular magnetic recording medium comprising:
   a substrate;
   a perpendicular magnetic recording layer; and
   an underlayer between the substrate and the perpendicular magnetic recording layer, the underlayer comprising Fe and at least about 8 at, percent Cr;
   wherein the underlayer is substantially amorphous and comprises at least one of Zr, Ta, and B.

2. The perpendicular magnetic recording medium of claim 1, wherein the underlayer comprises a soft magnetic underlayer.

3. The perpendicular magnetic recording medium of claim 1, wherein the underlayer further comprises Co.

4. The perpendicular magnetic recording medium of claim 1, wherein the underlayer comprises less than about 40 at, percent Cr.

5. The perpendicular magnetic recording medium of claim 1, wherein the underlayer comprises about 8 to about 25 at, percent Cr.

6. The perpendicular magnetic recording medium of claim 1, wherein the underlayer has a thickness greater than 30 nanometers.

7. The perpendicular magnetic recording medium of claim 1, wherein the underlayer has a thickness between about 100 nm and about 200 nm.

8. The perpendicular magnetic recording medium of claim 1, wherein the perpendicular magnetic recording layer has a thickness between about 5 nm and about 30 nm.

9. The perpendicular magnetic recording medium of claim 1, wherein the underlayer is configured to provide a return path for a recording head.

10. The perpendicular magnetic recording medium of claim 1, further comprising a seedlayer between the substrate and underlayer, wherein the seedlayer is configured to change the magnetostriction of the underlayer.

11. The perpendicular magnetic recording medium of claim 1, wherein the underlayer has a surface roughness below 0.4 nm.

12. A perpendicular magnetic recording medium comprising:
   a substrate;
   a perpendicular magnetic recording layer; and
   an underlayer between the substrate and the perpendicular recording magnetic layer, the underlayer comprising Fe, Co, and at least about 8 at, percent Cr, wherein the underlayer is substantially amorphous and comprises at least one of Zr, Ta, and B.

13. The perpendicular magnetic recording medium of claim 12, wherein the underlayer comprises a soft magnetic underlayer.

14. The perpendicular magnetic recording medium of claim 12, wherein the underlayer comprises B.

15. The perpendicular magnetic recording medium of claim 12, wherein the underlayer comprises at least about 11 at, percent Cr.

16. The perpendicular magnetic recording medium of claim 12, wherein the underlayer comprises about 8 to about 25 at, percent Cr.

17. The perpendicular magnetic recording medium of claim 12, wherein the underlayer has a thickness greater than 30 nanometers.

18. A method for manufacturing a perpendicular magnetic recording medium, the method comprising:
   depositing an underlayer on a substrate, the underlayer comprising Fe and at least about 8 at, percent Cr, wherein the underlayer is substantially amorphous and comprises at least one of Zr, Ta, and B; and
   depositing a perpendicular magnetic recording layer on the underlayer.

19. The method of claim 18, wherein the underlayer further comprises Co.

20. The method of claim 18, wherein the underlayer comprises about 8 to about 25 at, percent Cr.

* * * * *

UNITED STATES PATENT AND TRADEMARK OFFICE
CERTIFICATE OF CORRECTION

PATENT NO. : 8,313,848 B2  
APPLICATION NO. : 13/209967  
DATED : November 20, 2012  
INVENTOR(S) : Raj Nagappan Thangaraj et al.

Page 1 of 1

It is certified that error appears in the above-identified patent and that said Letters Patent is hereby corrected as shown below:

In the Claims

Column 9, line 16, Claim 1: "8 at, percent Cr;" should read --8 at. percent Cr;--.

Column 9, line 25, Claim 4: "40 at, percent Cr." should read --40 at. percent Cr.--.

Column 9, line 28, Claim 5: "25 at, percent Cr." should read --25 at. percent Cr.--.

Column 10, line 12, Claim 12: "8 at, percent Cr," should read --8 at. percent Cr,--.

Column 10, line 22, Claim 15: "at, percent Cr." should read --at. percent Cr.--.

Column 10, line 25, Claim 16: "25 at, percent Cr;" should read --25 at. percent Cr;--.

Column 10, line 32, Claim 18: "8 at, percent Cr;" should read --8 at. percent Cr,--.

Column 10, line 40, Claim 20: "25 at, percent Cr;" should read --25 at. percent Cr.--.

Signed and Sealed this  
Twelfth Day of February, 2013

Teresa Stanek Rea  
*Acting Director of the United States Patent and Trademark Office*